Aug. 22, 1961　　　T. P. MULGRAVE ET AL　　　2,997,254
GYRO STABILIZED VERTICAL RISING VEHICLE (DISCOID)
Filed Oct. 30, 1959　　　　　　　　　　　2 Sheets-Sheet 1

INVENTORS
Thomas P. Mulgrave
Friedrich O. Ringleb
BY
Arthur L. Collins
Attorney

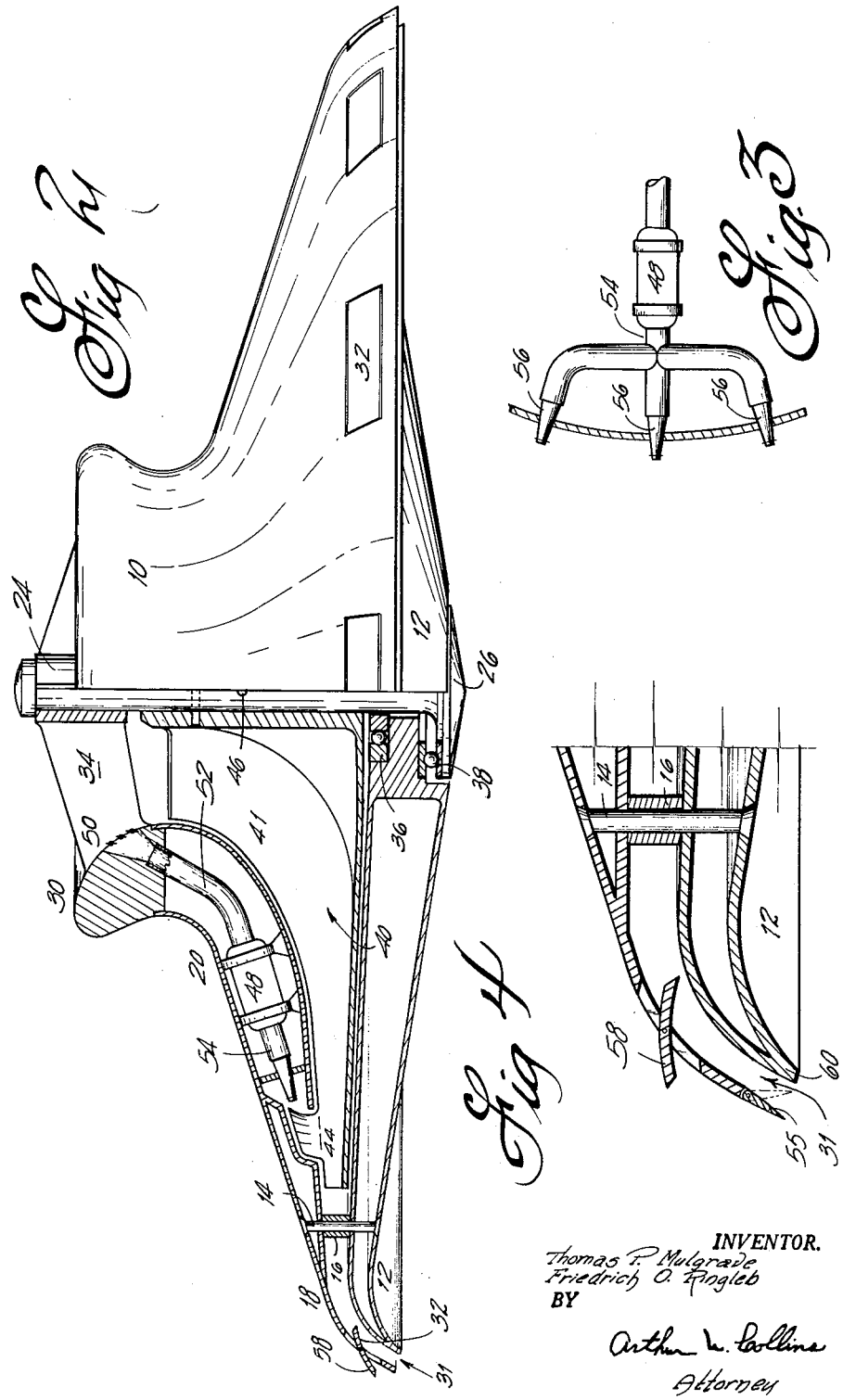

3,997,254
Patented Aug. 22, 1961

2,997,254
GYRO STABILIZED VERTICAL RISING VEHICLE (DISCOID)
Thomas P. Mulgrave, 2 Gov. Markham Drive, R.D. 2, Box 20, Glen Mills, Pa., and Friedrich O. Ringleb, 22 NW. Jersey Ave., Woodbury Heights, N.J.
Filed Oct. 30, 1959, Ser. No. 849,998
4 Claims. (Cl. 244—12)
(Granted under Title 35, U.S. Code (1952), sec. 266)

The invention described herein may be manufactured and used by or for the Government of the United States of America for governmental purposes without the payment of any royalties therein or therefor.

This invention relates to a flying device and more particularly to that type of device wherein the wing, tail and fuselage are embodied in a compact integral structure having a configuration and fluid impelling apparatus that derives sufficient lift to provide vertical take-offs and landings.

It is an object of this invention to provide a device with low drag in horizontal flight.

Another object is to provide a flying device wherein its configuration and fluid impelling structure provide lifting effects due to the aerodynamic flow pattern of the fluid passing over and through the device.

Yet another object of this invention is to provide a flying device of greater strength, stability, security, compactness and simplicity of construction, which concomitantly eliminate elevator airfoils, ailerons, outside rudders or other factors of empennage and parasite drag.

Other objects and many of the attendant advantages of this invention will be readily appreciated as the same becomes better understood by reference to the following detailed description which is considered in connection with the accompanying drawings wherein:

FIG. 2 is a partial cross-section taken along line 2—2 of FIG. 1.

FIG. 3 is an enlarged view of the nozzle portion of the gas generator of FIG. 2 better illustrating the position of the nozzles.

FIG. 4 is an enlarged view of the lip portion along the outer periphery of the device of FIG. 2 better illustrating the flow control means and the shape of the lower edge of the lip around this outer periphery.

Figure 1:
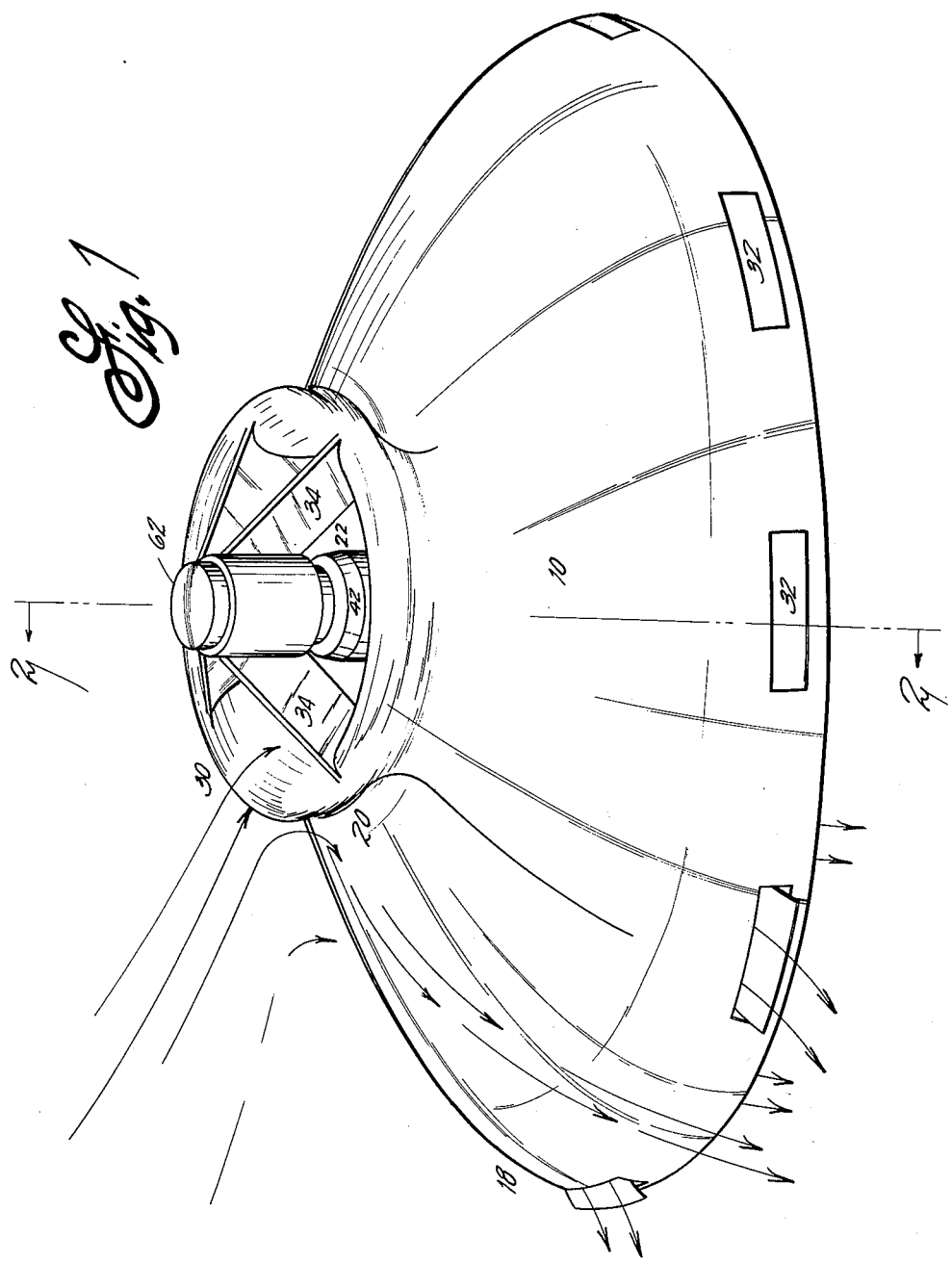
FIG. 1 is a perspective view of the device embodying my invention.

Referring in particular to FIGS. 1 and 2 of the drawings, the exterior surface or contour of the device is defined by the two sections 10 and 12. The section 10 is generally bell-shaped with its outer surface sloping upwardly and inwardly between the points 18 and 20 and then flaring outwardly again at 20 to form the crown or lip portion 30. The central circular opening 22 is formed in the top or crown of the plate. The contour of the top section 10 between points 20 and 30 as shown in FIG. 2 is S or ogee-shaped. This produces a lip configuration around the periphery of the opening 22.

Section 12 is also generally bell-shaped though somewhat more flattened than section 10. Section 10 and 12 are fixedly positioned one to the other with their outwardly flaring extremities juxtaposed and spaced a predetermined distance apart by means of the peripherally positioned studs 14 and spacing sleeves 16. With the plates secured in this manner, an annular cavity is defined in the area therebetween. This cavity, when seen in cross-section (FIG. 2) tapers, that is, it narrows from the opening 22 toward the peripheral extremity 32.

Section 10 is journaled on the shaft 24 by means of the spaced rib elements 34. Section 12 is similarly journaled on the shaft 24 by the radial thrust bearing 36 which allows rotation of sections 10 and 12 on the shaft. The vertical thrust bearing 38 is affixed to the flanged extremity 26 of the shaft 24 for withstanding the vertical thrust of the housing formed by sections 10 and 12.

The impeller assembly 40 which is fixedly mounted on shaft 24 by means of one or more pins 46 includes a plurality of impeller blades 41. These blade elements are in balanced relationship around the shaft and extend radially from the shaft into the cavity between sections 10 and 12. The taper of blades 40 follow the taper of the cavity formed by sections 10 and 12 so as to partition the interior of the cavity into separate multiple passageways which terminate at the relatively narrow extremities 32. Vanes 44 are secured to the extremities of blades 41.

A plurality of gas generators 48 are provided with air inlet conduits 50 connected to the opening 22 in section 10. Propulsion nozzles 56 (FIG. 3) connected to the exhaust end of gas chamber 48 through plenum chamber 54, directs the combusted air and gases upon the vanes 44 of blades 41. The preferred embodiment consists of four such generators balanced around the periphery of the opening 22.

The louver 55, disposed at the extremity of section 10 (FIG. 4) and individually operable by the pilot in a manner not shown in the drawing determines the area of the exhaust openings. The louver 58 varies the resultant vector of the exhaust thrust of air.

In operation the gas generator 48 is ignited, air is drawn from the opening 22 through the vertical inlet 50, and directed by the conduit 52 into the generator 48. The air is then heated and expelled by the propulsion nozzles 56 onto the vanes 44 causing the impeller assembly 40 to rotate.

Rotation of the blades 41 of the impeller assembly 40 draws air from the outer surface 20 of section 10 up and over the lip 30 into the opening 22. Due to the configuration of the lip 30, the velocity of the air increases substantially as it passes over the lip without separating from the boundary layer surface. In addition the velocity of the air inside the shell also increases because of the tapering of the passageways. The ultimate velocity of the air can be controlled to some degree by varying the areas of the outlets 32 through rotation of the louver 55.

The high velocity of the air over the lip 30 without separation from the boundary causes a lifting force upon the device.

The contour of the peripheral lip of section 12 defines a cusp configuration at 60. This cusped configuration at 60 permits the formation of a vortex in the cusp cavity under the plate 12 which remains in equilibrium due to the design characteristics of the cusp and performs a dual function. First, it increases the flow velocity at point 18 of the wing. Second, it acts as a roller bearing for the flow in directing the airstream from the annular opening 31 at the trailing edge of the wing thereby eliminating possibility of boundary layer separation on the trailing edge of the surface 10 of the wing.

The rush of air down through the passages created in the internal cavity by the vanes 40 causes the wing to rotate around the shaft 24 producing a gyroscopic stability and the attainment of high angular momentum which reduces friction. The stationary collar 62 and the flanged extremity 26 prevent the wing from rotating off of the shaft.

The above description of the operation whereby high lifting forces are produced on the surface of the wing permit a vertical take-off and landing of this aircraft. In the event that it is desired to change from vertical to transitional flight the louvers 58 are operated to change the direction of the thrust of air passing through the cavity in the interior of the wing.

Obviously many modifications and variations of the present invention are possible in the light of the above teachings. It is therefore to be understood that within the scope of the appended claims the invention may be practiced otherwise than as specifically described herein.

What is claimed is:

1. A flying device comprising an airfoil structure having a central circular opening therein; said structure having a top section being generally bell-shaped, and substantially ogee or S-shaped around the periphery of said opening; a bottom section also being generally bell-shaped, spaced a predetermined distance from the top section so as to form a chamber therebetween which opens into said opening in the top section, said chamber having its sides progressively tapering inwardly to provide a relatively narrow opening around the outer periphery of the two sections; the outer extremity of the lower section being contoured to a curvilinear wall surface including a cusp so as to facilitate stabilization of a fluid vortex behind the cusp; a shaft vertically disposed in said opening; means for rotatably mounting the structure upon the shaft so that the structure may rotate independently of the shaft; a plurality of blades secured to the shaft, extending radially in balanced relationship from the shaft into the said chamber and partitioning the interior of said chamber into separate multiple passages; power means for rotating said blades whereby fluid is drawn radially inwardly across the top section of said structure over the top of the lip and downwardly through the opening over the cusp whereby a lifting thrust is effected at various points along the surface of the structure.

2. A device according to claim 1 including a plurality of louvers located at the peripheral extremity of the top section for controlling the velocity of the fluid drawn into the chamber.

3. A device according to claim 2 further including a second plurality of louvers located on the periphery of the top section for changing the direction of the fluid discharged at the periphery of the structure.

4. A flying device comprising a circular airfoil structure having a central circular opening therein; said structure being defined by two sections, a top section and a bottom section, spaced a predetermined distance apart and being substantially symmetrical about a vertical axis through said opening wherein the peripheral surface of the top section adjacent the periphery of the opening is substantially ogee or S-shaped, whereby the air will be sucked over the top of the said lip so as to create a lifting effect therein; a shaft vertically disposed in said opening; means for rotatably mounting the structure upon the shaft so that the structure may rotate independently of the shaft; a plurality of blades secured to the shaft, extending radially in balance relationship from the shaft; a plurality of gas generators located in the upper section of said structure in balanced relationship about the shaft; conduit means for leading air from the said opening in the structure through the gas generators; means for heating the air; a plurality of nozzle means to expell the heated air from the gas generators to cause rotation of said blades whereby air is drawn radially inwardly across the top section of said airfoil structure and downwardly through the opening; means for expelling the air through the bottom of the opening to produce a lifting thrust.

References Cited in the file of this patent

UNITED STATES PATENTS

| | | |
|---|---|---|
| 1,047,266 | Mees | Dec. 17, 1912 |
| 1,123,589 | Porter | Jan. 5, 1915 |
| 2,718,364 | Crabtree | Sept. 20, 1955 |
| 2,807,428 | Wibault | Sept. 24, 1957 |
| 2,899,149 | Breguet | Aug. 11, 1959 |